United States Patent
Damoulis et al.

(10) Patent No.: US 10,875,592 B2
(45) Date of Patent: Dec. 29, 2020

(54) AUTOMOBILE MANUFACTURING PLANT AND METHOD

(71) Applicants: Carl Zeiss Industrielle Messtechnik GmbH, Oberkochen (DE); Carl Zeiss Industrial Metrology, LLC, Maple Grove, MN (US)

(72) Inventors: Gleiton Luiz Damoulis, Neu-Ulm (DE); Marcin B. Bauza, Plymouth, MN (US)

(73) Assignees: Carl Zeiss Industrielle Messtechnik GmbH, Oberkochen (DE); Carl Zeiss Industrial Metrology, LLC, Maple Grove, MN (US)

(*) Notice: Subject to any disclaimer, the term of this patent is extended or adjusted under 35 U.S.C. 154(b) by 36 days.

(21) Appl. No.: 15/999,118

(22) Filed: Aug. 16, 2018

(65) Prior Publication Data

US 2020/0055558 A1    Feb. 20, 2020

(51) Int. Cl.
*B62D 65/00* (2006.01)
*G01B 11/25* (2006.01)
*G01B 11/00* (2006.01)

(52) U.S. Cl.
CPC .......... *B62D 65/005* (2013.01); *G01B 11/002* (2013.01); *G01B 11/2513* (2013.01)

(58) Field of Classification Search
CPC .. B62D 65/005; G01B 11/002; G01B 11/2513
See application file for complete search history.

(56) References Cited

U.S. PATENT DOCUMENTS

| | | |
|---|---|---|
| 9,267,780 B2 | 2/2016 | Abe |
| 2003/0112448 A1 | 6/2003 | Maidhof et al. |
| 2008/0016119 A1* | 1/2008 | Sharma ............ G05B 19/41875 |
| 2013/0050410 A1 | 2/2013 | Steinbichler et al. |
| 2013/0271573 A1 | 10/2013 | Steinbichler et al. |
| 2019/0101903 A1* | 4/2019 | Katti .................. G05B 19/4188 |

FOREIGN PATENT DOCUMENTS

WO    WO2009007130 A1    1/2009

* cited by examiner

*Primary Examiner* — John C Hong
(74) *Attorney, Agent, or Firm* — Harness, Dickey & Pierce, P.L.C.

(57) ABSTRACT

An automobile manufacturing plant for manufacturing automobiles has a series of manufacturing sites including a part forming shop, a body shop, a paint shop and an assembly shop. Each manufacturing site is associated with a respective inspection site. The respective inspection sites provide inspection data representing at least one of dimensional characteristics, shape characteristics or surface characteristics of the car body parts, the car body, the painted car body and the car-on-wheels produced in the series of manufacturing sites. The inspection data from the plurality of inspection sites is correlated in a common data base server. Inspection sites at a later stage of the manufacturing process can use inspection data from previous stages and automatically decide whether or not a car body part, the car body, the painted car body or the car-on-wheels has to be reworked.

12 Claims, 3 Drawing Sheets

AUTOMOBILE MANUFACTURING PLANT AND METHOD

FIELD OF THE INVENTION

The present invention relates to an automobile manufacturing plant and method for manufacturing automobiles, and, more particularly, to an automobile manufacturing plant and method employing an improved quality management approach.

BACKGROUND OF THE INVENTION

Automotive original equipment manufacturers invest millions in quality inspection equipment along the process chain in order to strive for desired quality specifications being produced in the production lines. Typically, automobile manufacturing starts at a part forming shop, such as a press shop in particular, where a plurality of car body parts are formed. The car body parts are subsequently assembled at a car body shop in order to produce a car body, which is sometimes referred to as body-in-white. Following that, the car body is painted in a paint shop to produce a painted car body. The painted car body is put on wheels in a subsequent assembly shop, where the painted car body is combined with the drive train including the engine and the wheels, and where further car parts including window panes, interior parts etc. are mounted in or on the painted car body.

Quality inspections are typically carried out at various steps along this process chain. Up to know, visual inspections by humans, who have been appropriately trained, are widely employed, especially when it comes to surfaces of the car that are relevant for a customer's quality perception (usually called customer's perceived quality surfaces. One problem with this approach is that visual inspections may depend on the training level, the experience and personal skills of the individual human inspector so that a unified standard is hard to achieve.

Moreover, the later a part not conforming to the quality standards is detected, the more costly is the repair. By way of example, it is easier and less costly to remove a dent in an unpainted sheet metal car body part than removing the dent after the paint job and the final assembly have taken place.

U.S. Pat. No. 9,267,780 B2 discloses a 3D shape measurement system designed for quality inspections on a car body. A plurality of 3D shape measuring machines of articulated arm type are arranged so that their respective measurement ranges overlap in order to allow measurement of the car body or the car-on-wheels. Coordinate data from the plurality of 3D shape measuring machines are synthesized into a common coordinate system. This prior art, however, is a typical example of an isolated quality inspection approach employing human inspectors that operate the 3D shape measuring machines.

US 2003/0112448 A1, US 2013/0271573 A1 and US 2013/0050410 A1 disclose further examples of 3D measurement approaches for quality inspection in automobile manufacturing environments, with respective 3D coordinates of a car part or a car body being determined using optical, non-contact measurement approaches. 3D measurement, however, cannot provide inspection data that is representative of all the aspects that are relevant for a customer's quality perception. For example, 3D measurement data does typically not allow to detect polishing flaws or gloss deviations on a painted car body surface, although such defects are highly relevant for a customer's quality perception.

WO 2009/007130 A1 discloses a method and a device that allows to detect flaws in a specular car body surface, but it does not cover the whole process chain. Defects and flaws are only detected at a very late stage in the manufacturing process.

Therefore, there is still room for improvement, although car manufacturing industry has already achieved a high level of quality. In particular, today's quality inspection approach is less than perfect in terms of efficiency and costs.

SUMMARY OF THE INVENTION

In view of the above, it is an object of the present invention to provide for an automobile manufacturing plant employing an improved quality inspection approach. More particularly, it is an object of the present invention to provide an automobile manufacturing plant allowing a more efficient and/or less costly car manufacture.

It is a further object of the present invention to provide for an automobile manufacturing plant that allows to manufacture a plurality of automobiles, each of which precisely complies with a uniform quality standard.

It is yet a further object of the present invention to provide for an automobile manufacturing plant that allows to identify and correct for manufacturing flaws and defects at any stage of the manufacturing process.

According to a first aspect, there is provided an automobile manufacturing plant for manufacturing automobiles, comprising a series of manufacturing sites including a part forming shop configured for forming a plurality of car body parts from at least one of sheet metal or composite materials, a body shop configured for assembling the plurality of car body parts in order to form a car body, a paint shop configured for painting the car body in order to produce a painted car body, and an assembly shop configured for assembling a car-on-wheels using the painted car body, a plurality of inspection sites including a first inspection site associated with the part forming shop and configured for determining first inspection data representing at least one of dimensional characteristics, shape characteristics or surface characteristics of the plurality of car body parts, a second inspection site associated with the body shop and configured for determining second inspection data representing at least one of dimensional characteristics, shape characteristics or surface characteristics of the car body, a third inspection site associated with the paint shop and configured for determining third inspection data representing at least one of dimensional characteristics, shape characteristics or surface characteristics of the painted car body, and a fourth inspection site associated with the assembly shop and configured for determining fourth inspection data representing at least one of dimensional characteristics, shape characteristics or surface characteristics of the car-on-wheels, and a common data base server comprising nominal data representing nominal characteristics of the car body parts, of the car body, of the painted car body and of the car-on-wheels, and configured for receiving the first inspection data, the second inspection data, the third inspection data and the fourth inspection data, wherein the first inspection site comprises a first processor in communication with the common data base server and configured for automatically deciding whether or not the car body parts comply with the nominal characteristics of the car body parts by using the first inspection data, wherein the second inspection site comprises a second processor in communication with the common data base server and configured for automatically deciding whether or not the car body complies with the nominal characteristics of the car body by using the first and second inspection data, wherein the third inspection site comprises a third processor in communication with the common data base server and configured for automatically deciding whether or not the painted car body complies with the nominal characteristics of the painted car body by using the first, second and third inspection data, wherein the fourth inspection site comprises a fourth processor in communication with the common data base server and configured for automatically deciding whether or not the painted car-on-wheels complies with the nominal characteristics of the car-on-wheels by manufacturing sites using the first, second, third and fourth inspection data, and wherein each of the first, second, third and fourth processors is configured to automatically produce a respective rework request signal if at least one of the car body parts, the car body, the painted car body or the car-on-wheels does not comply with the nominal characteristics, and wherein said at least one of the car body parts, the car body, the painted car body or the car-on-wheels is maintained at or remitted to the manufacturing sites in response to the respective rework request signal in order to rework said at least one of the car body parts, the car body, the painted car body or the car-on-wheels.

According to another aspect, there is provided a method of manufacturing an automobile, comprising the steps of providing a common database server comprising nominal data representing nominal characteristics of nominal car body parts, of a nominal car body assembled from the nominal car body parts, of the nominal car body after painting and of a nominal car-on-wheels assembled from the nominal car body after painting, manufacturing a plurality of real car body parts at a part forming shop using the nominal characteristics, inspecting the plurality of the real car body parts at a first inspection site in order to determine first inspection data representing at least one of dimensional characteristics, shape characteristics or surface characteristics of the plurality of real car body parts, wherein the first inspection data is compared with the nominal characteristics of the nominal car body parts in order to automatically produce a car body part rework request signal, wherein the plurality of real car body parts are reworked depending on the car body part rework request signal, and wherein the first inspection data is stored on the common database server, assembling the plurality of real car body parts at a body shop in order to produce a real car body, inspecting the real car body at a second inspection site in order to determine second inspection data representing at least one of dimensional characteristics, shape characteristics or surface characteristics of the real car body, wherein the second inspection data is compared with the nominal characteristics of the nominal car body and with the first inspection data in order to automatically produce a car body rework request signal, wherein the real car body is reworked depending on the car body rework request signal, and wherein the second inspection data is stored on the common database server, painting the real car body at a paint shop in order to produce a painted real car body, inspecting the painted real car body at a third inspection site in order to determine third inspection data representing at least one of dimensional characteristics, shape characteristics or surface characteristics of the painted real car body, wherein the third inspection data is compared with the nominal characteristics of the nominal car body after painting and with the second inspection data in order to automatically produce a painted car body rework request signal, wherein the real painted car body is reworked depending on the painted car body rework request signal, and wherein the third inspection data is stored on the common database server, manufacturing a real car-on-wheels from the painted real car body at an assembly shop, and inspecting the real car-on-wheels at a fourth inspection site in order to determine fourth inspection data representing at least one of dimensional characteristics, shape characteristics or surface characteristics of the real car-on-wheels, wherein the fourth inspection data is compared with the nominal characteristics of the nominal car-on-wheels and with the third inspection data in order to automatically produce a car-on-wheels rework request signal, wherein the real car-on-wheels is reworked depending on the caronwheels rework request signal, and wherein the fourth inspection data is stored on the common database server The new automobile manufacturing plant and method make use of a plurality of inspection sites, with at least one inspection site being associated with a respective manufacturing site. The plurality of inspection sites produce a plurality of inspection data that is collected and most advantageously correlated using a common data base server. The common data base server also comprises nominal data representing nominal characteristics of the car body parts, the car body, the painted car body and the car-on-wheels. The common data base server may be a cloud space server that is accessible via any internet protocol readily known to the skilled person and, accordingly, the common data base server may be located remote from the series of manufacturing sites and/or the plurality of inspection sites. Alternatively or in addition, the common data base server may be implemented using a plurality of data storage devices distributed across the automobile manufacturing plant. Moreover, the common data base server may be a central server located in the vicinity of or remote from the series of manufacturing sites and the plurality of inspection sites. In any case, the common data base server allows bidirectional communication with the plurality of inspection sites so that each inspection site can transmit respective inspection data to the common data base server and receive nominal data and/or inspection data from other inspection sites. Accordingly, the new automobile manufacturing plant benefits from bringing together the various inspection data. This allows, in particular, to check if quality standards established for early manufacturing steps in the process chain are maintained in later steps of the process chain.

In addition, the above mentioned inspection sites each are enabled for automatically deciding whether or not car body parts, the car body, the painted car body and the car-on-wheels comply with all desired nominal characteristics. Advantageously, human interactions in the quality inspection process are reduced to a minimum or even dispensed with. Instead, decision making is based on objective criteria defined by the nominal data and the inspection data from the inspection sites. Preferably, the nominal data defines tolerance intervals, and the inspection data and the nominal data are compared by the respective processor of the inspection sites in order to check if the current inspection data falls within the tolerance of the nominal data. For example, the nominal data may comprise a tolerance threshold defining an acceptable gap between adjacent car body parts and the inspection data may comprise digitized 3D measurement data representing an actual gap between the two adjacent car body parts. By comparing the current digitized measurement data and the nominal data taking into account the tolerance threshold, the second processor may automatically decide if the car body assembled from the various car body parts has to be reworked or not. If the current gap between adjacent car body parts exceeds the tolerance threshold, the second processor advantageously outputs a car body rework request signal and the car body is maintained in or remitted to the body shop for adjusting the relative position of the adjacent car body parts in order to comply with the desired standard.

Likewise, the third processor of the third inspection site may automatically decide if the painted car body has to be reworked depending on the third inspection site, which may represent scatter characteristics of the painted surface. If the scatter characteristics in the painted surface are within a predefined tolerance interval over a defined area of the painted car body surface, the third processor may automatically decide that the painted car body may proceed to the assembly shop for assembling the car on wheels. However, if the scatter characteristics are outside of the defined tolerance interval, the third processor may output a respective rework request signal and the painted car body may be maintained in or remitted to the paint shop for polishing and/or repainting the already painted car body.

Advantageously, the second, third and fourth processors have access to the first inspection data. For example, if scratches have been detected on the exterior surface of a car body part at the first inspection site, the second, third and fourth inspection sites may exploit the respective information and specifically inspect the respective exterior surface of the car body. Therefore, any downstream inspection site in the inspection process can more efficiently inspect critical surface areas. Advantageously, inspection data from the various inspection sites is correlated in order to assure that any flaws and defects are repaired at an early stage in the production process. The automatic decision making is facilitated and enhanced by using the correlated data from the common data base.

In summary of the above, the new manufacturing plant and method allow to reduce human interaction in the inspection process and to maintain a high level of uniform inspection criteria. Flaws and defects can be detected at an early stage in the production process and can be tracked throughout the production process. The new manufacturing plant therefore allows a highly efficient production process.

In a preferred refinement, the manufacturing sites further include a number of dedicated rework sites configured for reworking said at least one of the car body parts, the car body, the painted car body or the car-on-wheels.

This refinement allows to carry out time consuming repair work, while maintaining the high efficiency production line for the manufacture of new car parts, car bodies, painted car bodies and cars-on-wheels. Providing dedicated rework sites is particularly advantageous if rework requires time consuming disassembly and/or special treatments, such as in the case of scratch repair on a painted car body.

In a further refinement, the inspection sites comprise robotic cells having a number of robots, and comprise a number of measurement sensors operably mounted on the number of robots.

A measurement sensor may be moveably mounted on the robot and thereby provide an additional degree of freedom, or it may be fixedly mounted. In case of a measurement sensor moveably mounted to the robot, the measurement sensor may be moveable relative to the car body parts or car bodies along 7 degrees of freedom. Generally, measurements sensors operably mounted on robots allow to bring the measurement sensors very close to the car body parts and car bodies to be inspected, which facilitates high measurement accuracy. Moreover, robots provide flexibility in automatically positioning the measurement sensors relative to the car body parts and car bodies to be inspected. Therefore, efficiency is further increased.

According to a further refinement, the measurement sensors comprise at least one optical 3D sensor configured for determining 3D coordinate data representing at least one of dimensional or shape characteristics, and at least one optical surface sensor configured for detecting surface characteristics including at least one of pores, dents, pimples, scratches, notches, polishing flaws, gloss deviations, dirt or material inclusions.

The latter defects are typical surface defects that are readily visible to human eyes while they do not usually impair proper function of the car body parts or car bodies. However, they are usually perceived as severe and rarely accepted by customers who are prepared to pay the price for a factory new car. On the other hand, 3D coordinate data is well suited to inspect dimensional characteristics and/or shape characteristics, such as waviness, which may have an adverse effect to the function of the car parts or car bodies. By combining those types of sensors in the manufacturing plant, an extensive and integrated automatic quality inspection is facilitated.

Preferably, at least one optical 3D sensor and at least one optical surface sensor are employed in the first, second, third and fourth inspection sites, because use of this combined optical sensor technology allows high speed measurements over large surface areas with a sufficiently high accuracy.

According to a further refinement, the at least one 3D sensor comprises a 3D fringe projection sensor including a fringe projector and a camera.

Fringe projection sensors have proven to be very beneficial for digitizing complex objects, such as car body parts and car bodies. 3D fringe protection sensors advantageously provide high measurement accuracy combined with sufficiently high measurement speed.

According to a further refinement, the at least one optical 3D sensor comprises a photogrammetry sensor.

Photogrammetry sensors have proven beneficial for the inspection of large measurement objects, such as car bodies, because they facilitate synthesis of measurement data from various sides and faces of the car body. It is particularly preferred if a 3D fringe protection sensor and a photogrammetry sensor are combined in order to determine 3D coordinate data at one or more of the above mentioned inspection sites.

According to a further refinement, the at least one optical surface sensor comprises a deflectometry based camera sensor.

A deflectometry based camera sensor mimics visual surface inspection by human inspectors by exploiting changing reflections on a specular surface, if the specular surface is moved relative to a test pattern. It is particularly well suited for inspecting painted car body surfaces in order to detect scratches, gloss deviations, pimples and material inclusions.

In a further refinement, the common data base server is configured for building a track record for each car body part, car body, painted car body and car-on-wheels on the basis of the first inspection data, the second inspection data, the third inspection data and the fourth inspection data.

This refinement helps to identify and track any flaws and defects and their correction/removal over the whole manufacturing process. This facilitates efficient repair. For example, if scratches on the surface of a car body part have been detected at the first inspection site, gloss deviations on the painted surface may be easier identified based on the information relating to the previously detected scratches and any repair effort associated therewith.

In a further refinement, the common data base server comprises an individual identifier for each car-on-wheels, with said track record being associated with the individual identifier. In some exemplary embodiments, the individual identifier may be a vehicle identification number (VIN), which identifies the individual car over its whole lifetime. The individual identifier may be implemented using an RFID tag. By associating the track record with such an individual identifier, quality management is advantageously extended for future repair after the car has been delivered to a customer.

In a further refinement, the nominal data defines a plurality of relevant surfaces of the car-on-wheels, and the plurality of inspection sites are configured for determining the first, second, third and fourth inspection data for the relevant surfaces only.

This refinement helps to further increase efficiency of the quality inspection, because quality inspection is thus limited on those surface areas of the car-on-wheels that are prone to visual and/or perceivable flaws and defects. For example, dents or scratches on the engine hood of the car-on-wheels are typically to be seen as a result of light reflections that the consumer sees when he approaches the car. In contrast, the same type of dents or scratches at the lower site skirt of the car are less likely to be seen. By systematically restricting the quality inspection to relevant surfaces, as defined by the nominal data, the efficiency of the inspection process can be greatly increased.

In a further refinement, the common data base server is configured to correlate the first, second, third and fourth inspection data.

According to this refinement, the common data base server not only collects the first, second, third and fourth inspection data into a common data base, the first, second, third and fourth inspection data are also brought into a mutual relationship. For instance, 3D data from the first, second, third and/or fourth inspection data may be matched and aligned in order to check if previous defects have been successfully removed and/or new defects have occurred in the production line. On the one hand, this helps to establish an advantageous track record. On the other hand, this refinement helps to assure that each and any defect or flaw is corrected in the course of the manufacturing process.

It goes without saying that the features mentioned above and those yet to be explained below can be used not only in the respective combination, but also in other combinations or in isolation without departing from the scope of the present invention.

BRIEF DESCRIPTION OF THE DRAWINGS

Exemplary embodiments are shown in the drawing and will be explained in more detail in the following description. In the drawing.

DESCRIPTION OF PREFERRED EMBODIMENTS

Figure 1:
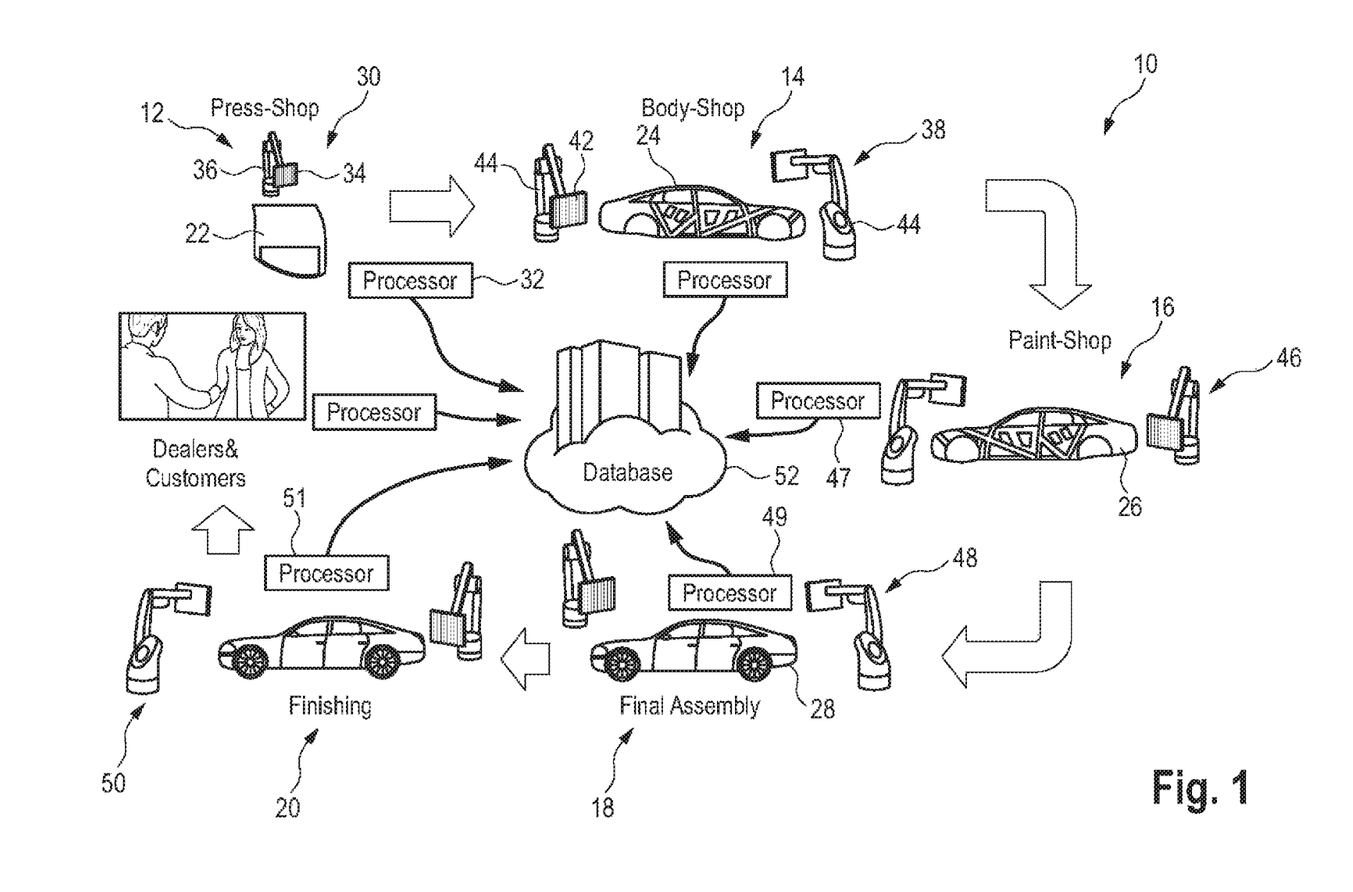
FIG. 1 shows a simplified illustration of an exemplary embodiment of the new automobile manufacturing plant.

In FIG. 1, an exemplary embodiment of an automobile manufacturing plant is designated by reference number 10 in its entirety. Manufacturing plant 10 comprises a press shop 12, a body shop 14, a paint shop 16, an assembly shop 18 and a finishing shop 20, which are arranged in series beginning with the press shop.

The press shop comprises machines that are capable of and configured to forming a plurality of car body parts, such as a door part 22. The door part 22 may be formed from sheet metal using a stamping machine (not illustrated here), as it is known to those skilled in the art. In some exemplary embodiments, car body parts, such as a door part 22, may be formed from composite materials, although this is less common in today's automobile manufacturing plants. In any case, a plurality of different car body parts are manufactured in press shop 12.

The plurality of car body parts from press shop 12 are assembled in order to build a car body in body shop 14. Car body parts from press shop 12 may be welded, stuck and/or glued together in order to form the car body 24, as it is known to those skilled in the art. Car body 24 assembled in body shop 14 is sometimes referred to as body-in-white.

The assembled car body is transferred to paint shop 16, where the car body is painted in a number of painting steps. A painted car body 26 is produced. Painted car body 26 is transferred to assembly shop 18, where the painted car body is combined with the drive train including the engine (not specifically illustrated) and further car parts including window panes, interior car parts, wheels etc. The result is a car-on-wheels 28. The car-on-wheels 28 may be transferred to a finishing shop, where a final inspection usually takes place before the finished car is sent to the dealers and final customers.

As can be seen from the simplified illustration in FIG. 1, manufacturing plant 10 further comprises a plurality of inspection sites, with at least one inspection site being associated with any of the manufacturing sites 12, 14, 16, 18, 20. As can be seen, a first inspection site 30 comprises a first data processor 32 and at least one first sensor 34, which may be arranged on a first robot 36. In some exemplary embodiments (not illustrated here), the first sensor may be arranged on another type of support structures, such as on a moveable or non-moveable gantry type structure. In some preferred exemplary embodiments, sensor 34 comprises an optical 3D sensor configured for determining 3D coordinate data, such as 3D sensor COMET L3D available from Carl Zeiss Optotechnik GmbH, 83115 Neubeuern, Germany. Sensor 34 may further comprise a photogrammetry sensor, as it is explained further down below with reference to FIG. 3. Alternatively or in addition, sensor 34 may comprise a tactile 3D sensor and/or an optical surface inspection sensor such as ABIS II available from Carl Zeiss Optotechnik GmbH and/or SurfMax available from Carl Zeiss Industrielle Messtechnik Austria GmbH. While only one robot 36 and only one sensor 34 are shown at press shop 12 in FIG. 1, a plurality of first sensors 34 arranged on any number of appropriate support structures may be used in order to determine first inspection data that is representative of the individual characteristics of the car body parts, such as door part 22.

In particular, surface inspection at press shop 12 may be configured for detecting dimensions, scratches, dirt, dents, and waviness on what is called A-surface parts. The car body parts are scanned by the sensor 34 and the results are saved. If all car body parts are OK, the system automatically releases them to be used in the body shop 14. If not, defective car body parts are to be reworked according to the findings and judgments of inspection site 30. Results of any inspected batch are saved for comparison with results from later process inspection.

Data processor 32 may be a general purpose computer, such as a personal computer running any operating system including Windows®, MACOS, Linux, by way of example, or it may be a special purpose computer including any available machine controller for controlling sensor 34 and robot 36. Data processor 32 is capable of and configured for processing measurement data captured by means of sensor 34 in order to determine the first inspection data, which is representative of at least one of dimensional characteristics, shape characteristics or surface characteristics of the plurality of car body parts 22. Data processor 32 may comprise a plurality of data processing equipment including a motion controller for robot 36 and a general purpose computer appropriately programmed for evaluating measurement data from sensor 34 in order to determine the first inspection data. In preferred exemplary embodiments, the first inspection site 30 comprises a plurality of sensors 34 in order to determine first inspection data representing surface characteristics of car body parts 22 and dimensional and shape characteristics of car body part 22 as well.

Associated with body shop 14 is a second inspection site 38, which comprises a second data processor 40, a number of second sensors 42, which are preferably arranged on a number of further robots 44. In preferred exemplary embodiments, the second inspection site 38 comprises a plurality of 3D digitizing sensors, such as COMET L3D and a plurality of surface inspection sensors such as ABIS II, already mentioned above. Notwithstanding, other types of sensors, such as tactile 3D sensors, laser scanners operated on coordinate measurement machines or robots may be used at second inspection site 38 in order to determine at least one of dimensional characteristics, shape characteristics or surface characteristics of car body 24. Again, it is preferred if second inspection site 38 is capable of and configured for determining dimensional characteristics, shape characteristics and surface characteristics of the car body and various measurement locations.

Paint shop 16 is associated with a third inspection site 46, while assembly shop 18 is associated with a fourth inspection site 48 and finishing shop 20 is associated with a fifth inspection site 50 in this exemplary embodiment. Inspection sites 46, 48, 50 may each comprise a respective data processor and a plurality of respective sensors movably arranged relative to the painted car body 26 and to the car-on-wheels 28, as will be appreciated by those skilled in the art. In some exemplary embodiments, inspection sites 38, 46, 48 and 50 employ the same type of measurement sensors and the same type of data processing equipment. In other exemplary embodiments, the inspection sites 38, 46, 48, 50 may differ from one another in terms of the number and/or the type of measurement sensors employed. In general, however, it is preferred that each inspection site 38, 46, 48, 50 is capable of and configured for determining dimensional characteristics, shape characteristics and surface characteristics of the painted car body and of the car-on-wheels. Notwithstanding, fourth inspection site 48 and fifth inspection site 50 may be combined into one inspection site. In other words, a finishing step associated with finishing shop 20 in FIG. 1 may be integrated into the assembly shop 18.

As can be seen from the illustration in FIG. 1, manufacturing plant 10 further comprises a common data base server 52 that is communicatively coupled with the processors 32, 40, 47, 49, 51 of inspection sites 30, 38, 46, 48, 50. Common data base server 52 may be a cloud server located and implemented on any suitable data base server equipment. Alternatively or in addition, data base server 52 may be a factory server implemented on any available server hardware at the manufacturing sites. In some exemplary embodiments, common data base server 52 may be implemented on a plurality of distributed data processing and data storage hardware including the data processing and data storage capacity of one or more of processors 32, 40 etc. Inspection sites 30, 38, 46, 48, 50 may advantageously transmit their respective inspection data to common data base server 52, and they may receive inspection data originating from earlier inspection runs and/or from other inspection sites from data base server 52. Preferably, data base server 52 is configured for matching respective inspection data from inspection sites 30, 38, 46, 48, 50 in order to provide correlated inspection data including, by way of example, a track record comprising inspection data representing the inspection results along the whole process chain. As already indicated further above, the correlated inspection data may be associated with an individual identifier, such as the digital identification number (VIN) of the car-on-wheels at the end of the production process. The correlated inspection data may comprise matching results derived from matching anyone of first inspection data, second inspection data, third inspection data, fourth inspection data and fifth inspection data originating from the respective inspection sites.

Figure 2:
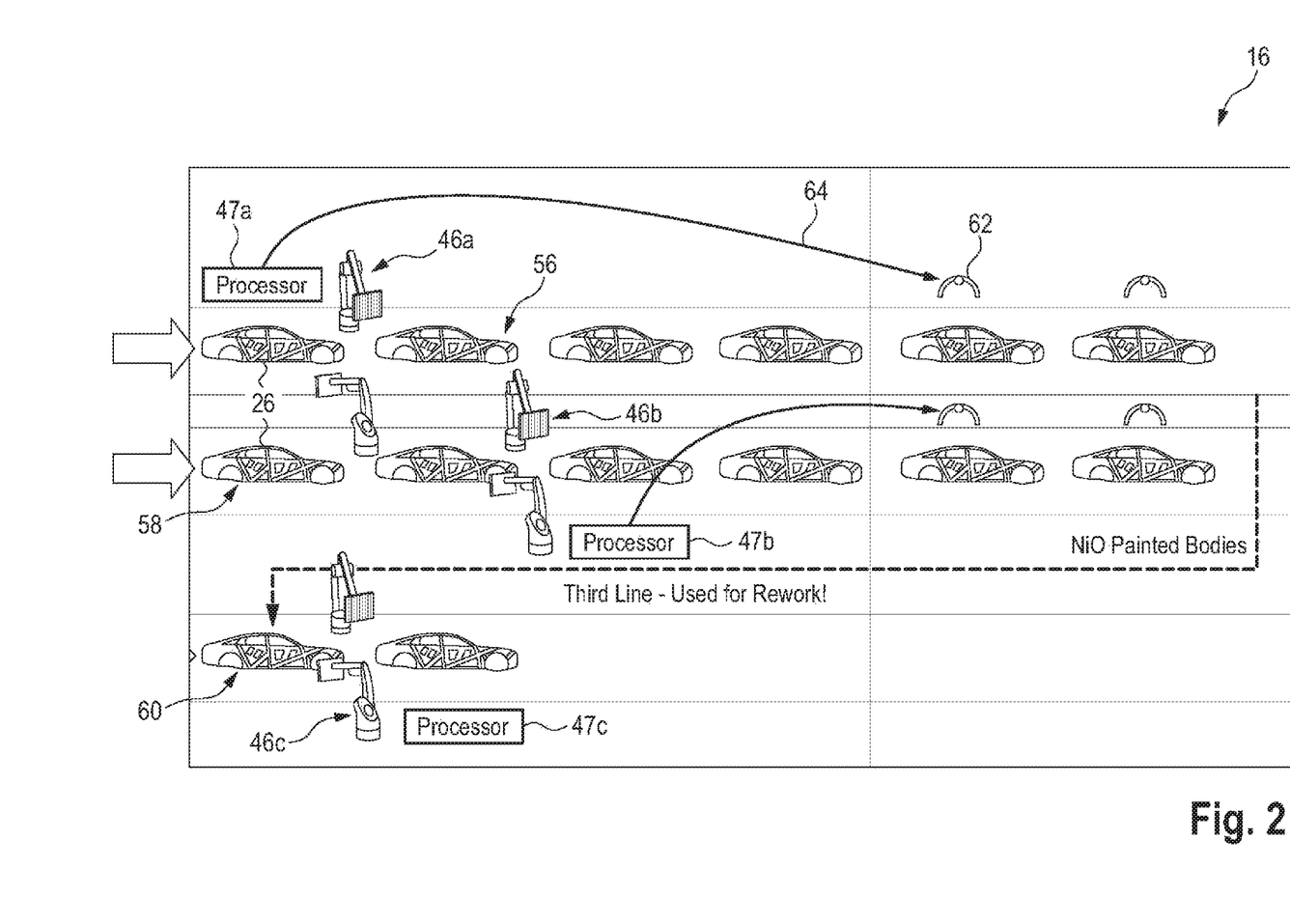
FIG. 2 shows a simplified illustration of an exemplary paint shop of the automobile manufacturing plant of FIG. 1.

FIG. 2 shows, by way of example, a simplified illustration of paint shop 16, where car bodies are painted in order to produce painted car bodies. By way of nonlimiting example, paint shop 16 comprises a first line 56 and a second line 58, which can be operated in parallel in order to increase throughput. A third line 60 may be used for reworking car bodies that have been found to be defective at third inspection site 46. As illustrated in FIG. 2, each line 56, 58, 60 may have a respective third inspection site 46a, 46b, 46c, respectively, including a respective processor 47a, 47b, 47c. According to preferred exemplary embodiments, each processor 47a, 47b, 47c may be configured for generating a respective rework request signal, if the inspected car body 26 is found to deviate from quality standards as defined by nominal data provided by common data base server 52. In case of minor flaws and defects, appropriate correction may be carried out manually at the end of each manufacturing and inspection line 56, 58, as it is indicated at reference number 62. Manual rework may be carried out by a human 62, to which the rework request signal 64 is transmitted. Rework request signal 64 may advantageously indicate details identifying the locations, the type and/or the size of the defective area on painted car body 26, so that human 62 can immediately start appropriate repair. If the area to be reworked, the number of areas to be reworked and/or the amount of required repair work is too big, automated and/or semi-automated rework may be advantageous. Accordingly, the defective painted car body 26 may be transferred to third line 60, which may exclusively be used for reworking defective car bodies. In some instances, it may be advantageous to remit a defective car body into the normal production process after appropriate repair steps have been initiated. It goes without saying that the other manufacturing sites may also have dedicated rework sites, as exemplified by third line 60 in FIG. 2.

Figure 3:
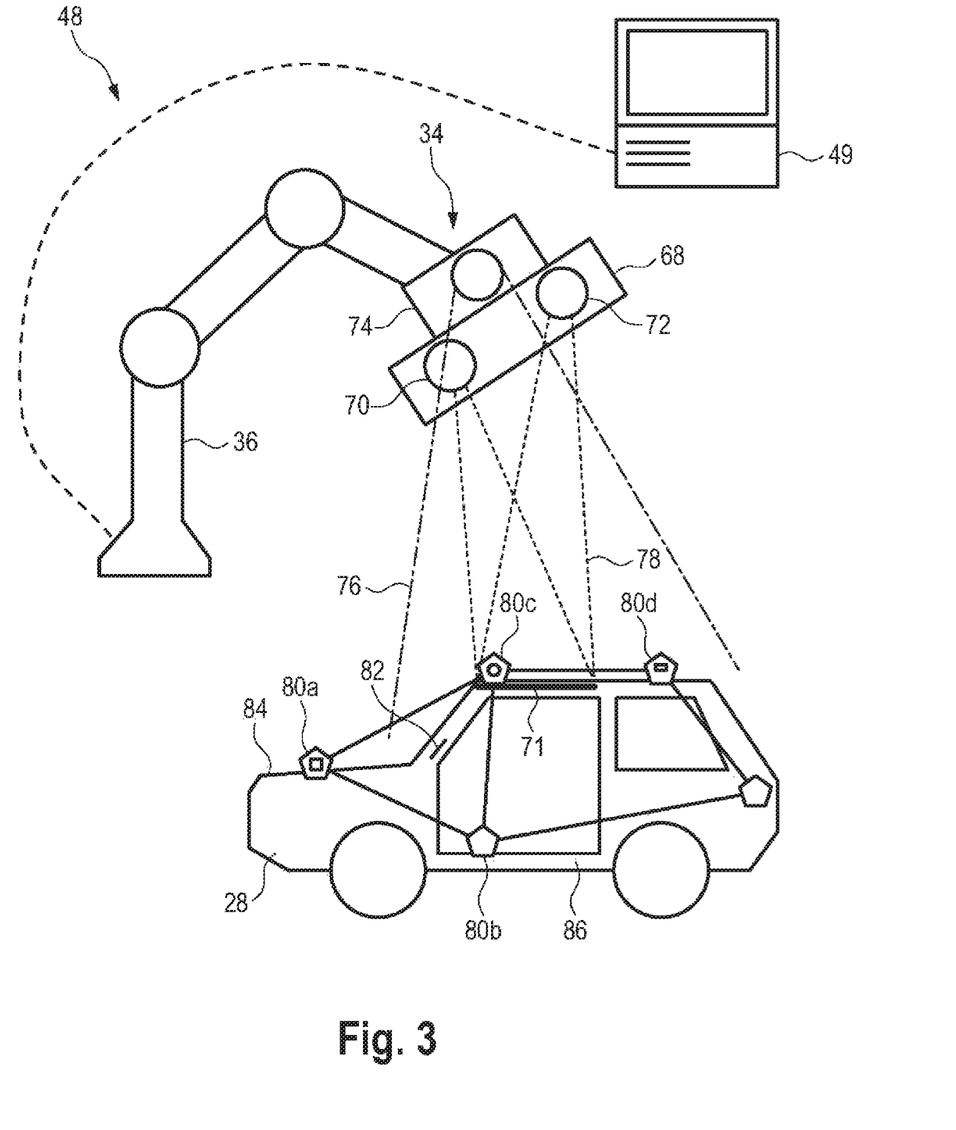
FIG. 3 shows a simplified illustration of an inspection site of the automobile manufacturing plant of FIG. 1

FIG. 3 shows some details of exemplary fourth inspection site 48, which may be representative for other measurements sites of manufacturing plant 10 as well. Measurement sensor 34 attached to robot 36 in this case comprises a 3D fringe projection camera sensor 68, such as COMET L3D from Zeiss Optotechnik GmbH. Fringe projection sensor 68 comprises a fringe projector 70 capable of and configured for projecting a light pattern 71 onto the surface of a measurement object, such as painted car body 28 in this example.

Typically, light pattern 71 is a structured light pattern comprising a combination of brighter and darker areas forming light stripes, light dots or combinations thereof. The projected light pattern 71 is captured by one or more cameras 72. The one or more cameras 72 are arranged at a known distance from projector 70. This allows to determine 3D coordinates of surface points in the area of light pattern 71 relative to a coordinate system defined by 3D fringe projection sensor 68. By moving 3D fringe projection sensor 68 relative to the car-on-wheels 28 using robot 36, the car-on-wheels 28 or parts of it can be digitized. By evaluating the digitized 3D inspection data, dimensional characteristics and shape characteristics of car-on-wheels 28, such as the size of a gap between car body panels, can be determined and compared with previous inspection data from inspection sites 30, 38, 46 and/or with nominal data.

In the exemplary embodiment shown, sensor 34 further comprises camera 74, which is preferably arranged in a fixed relationship relative to 3D fringe projection sensor 68. As can be seen from the simplified illustration in FIG. 3, camera 74 has a broader field of view 76 than field of view 78 of camera 72. Therefore, camera 74 may capture broader areas of car-on-wheels 28 than camera 72.

Reference numbers 80*a*, 80*b*, 80*c*, 80*d* designate a plurality of photogrammetry targets. Photogrammetry targets 80*a*, 80*b*, 80*c*, 80*d* represent artificial marking elements that are attached or otherwise positioned on car-on-wheels 28 in order to establish a net or grid of predefined target positions. Capturing the photogrammetry targets 80*a*, 80*b*, 80*c*, 80*d* from various perspectives by means of camera 74 allows to define a reference coordinate system or a list of known target positions, which can advantageously be used for aligning and matching the 3D inspection data from 3D fringe projection sensor 68. Accordingly, some preferred exemplary embodiments of sensor 34 may use a combination of a 3D fringe projection sensor 68 and a photogrammetry camera sensor 74 in order to determine inspection data that is collected in common data base server 52.

Sensor 34 may further comprise an optical camera sensor based on the principle of deflectometry as it is explained in "Phase Measuring Deflectometry: A new approach to measure specular free-form surfaces" by Markus Knauer et al., published in "Optical metrology in production engineering", Proc. SPIE 5457, 2004. Accordingly, sensor 34 may comprise a third camera (not illustrated here in FIG. 3) or one of cameras 72, 74 may be used for both capturing 3D inspection data and capturing deflectometric inspection data. The deflectometry sensor, such as Zeiss SurfMax, may particularly be used for detecting pores, dents, pimples, scratches, notches, polishing flaws, gloss deviations, dirt or material inclusions in or on the surface of the car body parts, the car body, the painted car body and the car-on-wheels. In general, optical sensors working in visible or non-visible light spectrum are preferred.

As indicated by reference number 82, car-on-wheels 28 typically has an individual identifier, such as a VIN and/or an RFID tag. Any inspection data determined by using sensor 34 may advantageously be associated with identifier 82 by respective data processor 49, and the various inspection data from inspection sites 30, 38, 46, 48, 50 is advantageously correlated on data base server 52 using the respective identifier 82.

In some exemplary embodiments, the inspection data captured by sensor 34 is restricted to a plurality of relevant surfaces of car-on-wheels 28, such as on engine hood 84 and other large area body panels including the car roof, the fenders and the trunk lid, while other surfaces, such as the surface of lower site skirt 86 may be disregarded or inspected with lower resolution and/or lower effort.

The inspection sites and/or the common database server may advantageously use one or more self-learning artificial intelligence (AI) approaches. Such approaches may involve a plurality of reference patterns established by training and defining characteristics of respective car body parts, respective car bodies, respective painted car bodies and respective cars-on-wheels that conform with predefined quality requirements. The inspection sites and/or the common database server may generate measured patterns based on the respective inspection data, and compare the respective measured patterns and the respective reference patterns in order to make an automated decision about whether or not a quality requirement is met. Conformities and/or non-conformities may be programmed, detected by smart system algorithms using AI. The system comprising the common database server and the inspection sites may thus learn "by itself" what is to be reworked and what is supposed to not be reworked. With sophisticated AI algorithms the system will make correct judgment, flagging only non-conformities which are relevant to customer perception and possible for rework ensuring that only components that should be reworked are repaired avoiding overkill which can be very costly. Accordingly, too much unnecessary rework (increasing costs) can be avoided. Preferably, the reference patterns correspond to those criteria that the car manufacturers use to train their human inspectors at the Quality gates to teach the "smart" system with AI. So the system also "learns by doing" as the inspectors. Advantageously, the system is not suitable to fatigue and the decision process is constant during all the working shift.

Advantageously, inspection data determined by previous inspection sites may be compared to inspection data from a subsequent inspection site. For instance, all surface data may be available in the part forming shop. When the car body is welded using the car parts, the body surface is inspected and the data stored in the common database server from the part forming shop may automatically be compared with the data from the car body shop. Non-conformities in the part forming shop may advantageously be reported to the inspection site associated with the body shop. Rework may take place at the part forming shop and/or the body shop. In any case, reworked parts may advantageously be inspected again at any subsequent inspection site. Preferably, the whole system establishes a closed-loop quality control principle. Preferably, the system establishes a plurality of closed-loop control process including a plurality of insite closed loop quality control at the first, second, third and fourth inspection sites and, in addition, further closed loop quality control processes at a higher level using information from the first, second, third and fourth inspection sites to control manufacturing work at all of the manufacturing sites.

If a non-conformity in a door panel is registered in the body shop, by way of example, and the same non-conformity has not been detected in the previous press shop, the non-conformity was obviously caused in the body shop. This is important information, because the Quality teams now know where the non-conformity comes from and the cause of the non-conformity can be eliminated. Advantageously, the system thus "learns" press shop problems, body problems, paint shop problems and assembly shop problems. In the assembly shop, all issues are checked again to verify rework effectiveness, search for new non-conformities and assure that no non-conformities were added during the assembly process, like scratches.

What is claimed is:

1. An automobile manufacturing plant for manufacturing automobiles, comprising:
a series of manufacturing sites including:
a part forming shop configured to form a plurality of car body parts from at least one of sheet metal or composite materials,
a body shop configured to assemble the plurality of car body parts in order to form a car body,
a paint shop configured to paint the car body in order to produce a painted car body, and
an assembly shop configured to assemble a car-on-wheels using the painted car body;
a plurality of inspection sites including:
a first inspection site associated with the part forming shop and configured to determine first inspection data representing at least one of dimensional characteristics, shape characteristics, or surface characteristics of the plurality of car body parts,
a second inspection site associated with the body shop and configured to determine second inspection data representing at least one of dimensional characteristics, shape characteristics, or surface characteristics of the car body,
a third inspection site associated with the paint shop and configured to determine third inspection data representing at least one of dimensional characteristics, shape characteristics, or surface characteristics of the painted car body, and
a fourth inspection site associated with the assembly shop and configured to determine fourth inspection data representing at least one of dimensional characteristics, shape characteristics, or surface characteristics of the car-on-wheels; and
a common database server comprising nominal data representing nominal characteristics of the plurality of car body parts, of the car body, of the painted car body, and of the car-on-wheels,
wherein:
the common database server is configured to receive the first inspection data, the second inspection data, the third inspection data, and the fourth inspection data,
the first inspection site comprises a first processor in communication with the common database server,
the first processor is configured to, based on the first inspection data, automatically determine whether the plurality of car body parts comply with the nominal characteristics of the plurality of car body parts,
the second inspection site comprises a second processor in communication with the common database server,
the second processor is configured to, based on the first and second inspection data, automatically determine whether the car body complies with the nominal characteristics of the car body,
the third inspection site comprises a third processor in communication with the common database server,
the third processor is configured to, based on the first, second, and third inspection data, automatically determine whether the painted car body complies with the nominal characteristics of the painted car body,
the fourth inspection site comprises a fourth processor in communication with the common database server,
the fourth processor is configured to, based on the first, second, third, and fourth inspection data, automatically determine whether the car-on-wheels complies with the nominal characteristics of the car-on-wheels,
each of the first, second, third, and fourth processor is configured to, in response to a determination that at least one of the plurality of car body parts, the car body, the painted car body, or the car-on-wheels does not comply with the nominal characteristics of the at least one of the plurality of car body parts, the car body, the painted car body, or the car-on-wheels, respectively, automatically produce a respective rework request signal, and the automobile manufacturing plant is configured to, in response to the respective rework request signal, maintain or remit the at least one of the plurality of car body parts, the car body, the painted car body, or the car-on-wheels at or to a manufacturing site of the series of manufacturing sites in order to rework the at least one of the car body parts, the car body, the painted car body, or the car-on-wheels.

2. The automobile manufacturing plant of claim 1, wherein the series of manufacturing sites further includes a number of dedicated rework sites configured to rework the at least one of the plurality of car body parts, the car body, the painted car body, or the car-on-wheels.

3. The automobile manufacturing plant of claim 1, wherein:
the inspection sites comprise robotic cells having a plurality of robots and
the automobile manufacturing plant further comprises a plurality of measurement sensors operably mounted on the plurality of robots.

4. The automobile manufacturing plant of claim 3, wherein the plurality of measurement sensors comprises:
an optical 3D sensor configured to determine 3D coordinate data representing at least one of dimensional or shape characteristics and
an optical surface sensor configured to detect surface characteristics including at least one of pores, dents, pimples, scratches, notches, polishing flaws, gloss deviations, dirt, or material inclusions.

5. The automobile manufacturing plant of claim 4, wherein the optical 3D sensor comprises a 3D fringe projection sensor including:
a fringe projector and
a camera.

6. The automobile manufacturing plant of claim 4, wherein the optical 3D sensor comprises a photogrammetry sensor.

7. The automobile manufacturing plant of claim 4, wherein the optical surface sensor comprises a deflectometry camera sensor.

8. The automobile manufacturing plant of claim 1, wherein the common database server is configured to, based on the first, second, third, and fourth inspection data, build a track record for each of the plurality of car body parts, for the car body, for the painted car body, and for the car-on-wheels.

9. The automobile manufacturing plant of claim 8, wherein:
the common database server comprises an individual identifier specific to the car-on-wheels and
the track record for the car-on-wheels is associated with the individual identifier.

10. The automobile manufacturing plant of claim 1, wherein:
the nominal data defines a plurality of relevant surfaces of the car-on-wheels and
the plurality of inspection sites are configured to determine the first, second, third, and fourth inspection data for the relevant surfaces only.

11. The automobile manufacturing plant of claim 1, wherein the common database server is further configured to correlate the first, second, third, and fourth inspection data.

12. A method of manufacturing an automobile, comprising:
- providing a common database server comprising nominal data representing nominal characteristics of nominal car body parts, nominal characteristics of a nominal car body assembled from the nominal car body parts, nominal characteristics of the nominal car body after painting, and nominal characteristics of a nominal car-on-wheels assembled from the nominal car body after painting;
- manufacturing a plurality of real car body parts at a part forming shop using the nominal characteristics;
- inspecting the plurality of real car body parts at a first inspection site in order to determine first inspection data representing at least one of dimensional characteristics, shape characteristics, or surface characteristics of the plurality of real car body parts, wherein:
  - the first inspection data is compared with the nominal characteristics of the nominal car body parts in order to automatically produce a car body part rework request signal,
  - the plurality of real car body parts are reworked depending on the car body part rework request signal, and
  - the first inspection data is stored on the common database server;
- assembling the plurality of real car body parts at a body shop in order to produce a real car body;
- inspecting the real car body at a second inspection site in order to determine second inspection data representing at least one of dimensional characteristics, shape characteristics, or surface characteristics of the real car body, wherein:
  - the second inspection data is compared with the nominal characteristics of the nominal car body and with the first inspection data in order to automatically produce a car body rework request signal,
  - the real car body is reworked depending on the car body rework request signal, and
  - the second inspection data is stored on the common database server;
- painting the real car body at a paint shop in order to produce a painted real car body;
- inspecting the painted real car body at a third inspection site in order to determine third inspection data representing at least one of dimensional characteristics, shape characteristics, or surface characteristics of the painted real car body, wherein:
  - the third inspection data is compared with the nominal characteristics of the nominal car body after painting and with the second inspection data in order to automatically produce a painted car body rework request signal,
  - the real painted car body is reworked depending on the painted car body rework request signal, and
  - the third inspection data is stored on the common database server;
- manufacturing a real car-on-wheels from the painted real car body at an assembly shop; and
- inspecting the real car-on-wheels at a fourth inspection site in order to determine fourth inspection data representing at least one of dimensional characteristics, shape characteristics, or surface characteristics of the real car-on-wheels, wherein:
  - the fourth inspection data is compared with the nominal characteristics of the nominal car-on-wheels and with the third inspection data in order to automatically produce a car-on-wheels rework request signal,
  - the real car-on-wheels is reworked depending on the car-on-wheels rework request signal, and
  - the fourth inspection data is stored on the common database server.

* * * * *